US006400159B1

United States Patent
Zeller et al.

(10) Patent No.: US 6,400,159 B1
(45) Date of Patent: *Jun. 4, 2002

(54) ORIENTATION SENSOR ESPECIALLY SUITABLE FOR USE IN AN UNDERGROUND BORING DEVICE

(75) Inventors: Rudolf Zeller, Renton; John E. Mercer, Kent, both of WA (US)

(73) Assignee: Digital Control Incorporated, Renton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/547,120

(22) Filed: Apr. 11, 2000

Related U.S. Application Data

(62) Division of application No. 08/986,294, filed on Dec. 6, 1997, now Pat. No. 6,066,955, which is a division of application No. 08/564,587, filed on Nov. 29, 1995, now Pat. No. 5,726,359.

(51) Int. Cl.[7] .................. G01N 27/02; G01N 27/00; G01R 31/34; G01C 15/10
(52) U.S. Cl. .................. 324/439; 324/446; 324/447; 324/448; 324/449; 324/450; 324/601; 324/722; 324/71.1; 33/366.11; 33/366.15; 33/366.21; 33/366.22; 33/366.26
(58) Field of Search .................. 324/439, 446, 324/447, 448, 449, 450, 601, 722, 71.1; 33/366.11, 366.15, 366.21, 366.22, 366.26

(56) References Cited

U.S. PATENT DOCUMENTS

| 2,338,811 | A | * | 1/1944 | Hasbrook | 33/366.22 |
| 3,096,591 | A | | 7/1963 | Higgins et al. | |
| 3,253,280 | A | * | 5/1966 | Feyling | 33/366.21 |
| 3,478,437 | A | * | 11/1969 | Cothran | 33/366.22 |
| 3,492,951 | A | | 2/1970 | Erspamer et al. | |

(List continued on next page.)

OTHER PUBLICATIONS

Signal Systems International, Inc., Metal Can Switch, Mar. 7, 1997, Signal Systems International, Inc. technical specification sheet.

*Primary Examiner*—N. Le
*Assistant Examiner*—Wasseem H. Hamdan
(74) *Attorney, Agent, or Firm*—Michael Pritzkau

(57) ABSTRACT

An orientation sensor especially suitable for use in an underground device is disclosed herein. This orientation sensor includes a sensor housing defining a closed internal chamber, an arrangement of electrically conductive members in a predetermined positional relationship to one another within the chamber and a flowable material contained within the housing chamber and through which electrical connections between the electrically conductive members are made such that a comparison between an electrical property, specifically voltage, of a first combination of conductive members to the corresponding electrical property of a second combination of conductive members can be used to determine a particular orientation parameter, specifically pitch or roll of the sensor. In one embodiment disclosed herein, the electrically conductive members include an array of wires, as contrasted with plates or cylinders and in all of the embodiments disclosed herein in which the sensor functions as a pitch sensor, the conductive members are adjustably configured so that the sensor can be calibrated.

11 Claims, 7 Drawing Sheets

U.S. PATENT DOCUMENTS

| | | | | |
|---|---|---|---|---|
| 3,839,904 A | * | 10/1974 | Stripling et al. | 33/366.15 X |
| 4,028,815 A | * | 6/1977 | Buckley | 33/366.21 |
| 4,167,818 A | * | 9/1979 | Cantarella et al. | 33/366.22 |
| 4,567,666 A | * | 2/1986 | Neis et al. | 33/366 X |
| 4,672,753 A | * | 6/1987 | Kent | 33/366.21 |
| 4,674,579 A | | 6/1987 | Geller et al. | |
| 4,714,118 A | | 12/1987 | Baker et al. | |
| 4,779,353 A | * | 10/1988 | Lopes et al. | 33/366 X |
| 4,787,463 A | | 11/1988 | Geller et al. | |
| 4,846,954 A | * | 7/1989 | Ryan et al. | 33/366.22 |
| 5,155,442 A | | 10/1992 | Mercer | |
| 5,159,761 A | * | 11/1992 | Cagan et al. | 324/676 |
| 5,172,481 A | * | 12/1992 | Wiseman et al. | 33/366 |
| 5,233,984 A | * | 8/1993 | Thompson | 33/377 X |
| 5,279,040 A | * | 1/1994 | Kippelt et al. | 33/366 |
| 5,337,002 A | | 8/1994 | Mercer | |
| 5,416,977 A | * | 5/1995 | Striffler et al. | 33/366 |
| 5,428,902 A | * | 7/1995 | Cheah | 324/707 |
| 5,444,382 A | * | 8/1995 | Mercer | 324/690 |
| 5,625,955 A | * | 5/1997 | Han | 33/366.15 |
| 5,630,280 A | * | 5/1997 | Crossan | 33/366.11 |
| 5,757,197 A | * | 5/1998 | O'Neill | 324/446 |

* cited by examiner

ORIENTATION SENSOR ESPECIALLY SUITABLE FOR USE IN AN UNDERGROUND BORING DEVICE

This is a Divisional application of application Ser. No. 08/986,294, filed on Dec. 6, 1997 now issued as U.S. Pat. No. 6,066,955 on May 23, 2000 which is a divisional of application Ser. No. 08/564,587 filed Nov. 29, 1995 now issued as U.S. Pat. No. 5,726,359 on Mar. 10, 1998, the disclosure of which is incorporated herein by reference.

BACKGROUND OF THE INVENTION

The present invention relates generally to an orientation sensor especially suitable for use in an underground boring device, and more particularly to a number of specifically configured orientation sensors and the way in which they are used to monitor pitch and/or roll of an object such as a remotely controlled underground boring device.

Presently, there are a number of different known types of orientation sensors which have been designed especially for use in remote controlled underground boring devices. One example can be found in U.S. Pat. No. 4,674,579 (Geller). Another example can be found in U.S. Pat. No. 4,714,118 (Baker). Still another example is described in Applicant's own U.S. Pat. Nos. 5,155,442, 5,337,002, and 5,444,382. These patents are incorporated herein by reference. As will be seen hereinafter, the present invention is directed to a number of specifically improved features not disclosed or made obvious in view of the exemplified prior art.

SUMMARY OF THE INVENTION

As will be described in more detail hereinafter, the orientation sensor disclosed herein includes a sensor housing defining a housing chamber, an arrangement of electrically conductive members in a predetermined positional relationship to one another within the chamber, and a flowable material contained within the chamber and through which electrical connections between the electrically conductive members are made such that a comparison between an electrical property, for example voltage, of a first combination of conductive members to the corresponding electrical property of a second combination of conductive members is indicative of a particular orientation parameter, specifically pitch or roll, of the orientation sensor.

In one embodiment of the present invention, the arrangement of electrically conductive members includes first and second such members disposed at first and second spaced apart locations, respectively, within the chamber and at least one electrically conductive wire supported by the housing and including a segment thereof disposed within the chamber at a location between the first and second electrical members. In this embodiment, the flowable material contained within the housing chamber makes an electrical connection between the first and second conductive members and the wire segment such that the comparison referred to above is a ratio and this ratio is indicative of the displacement of the flowable material within the housing chamber, whereby the orientation sensor is capable of generating an output voltage indicative of the pitch position of the sensor. Preferably, this embodiment of the present invention utilizes at least two wires which are electrically connected together and which include segments thereof crossing one another within the housing chamber, preferably within a common plane centrally located between the first and second members and perpendicular to one another.

In a second embodiment of the present invention, the orientation sensor disclosed herein includes an arrangement of electrically conductive members including an array of at least four electrically unconnected wire segments extending into the housing chamber in a predetermined positional relationship to one another within the housing and a flowable material contained within the housing chamber and through which electrical connections between the electrically conductive members are made such that, for any given roll position of the sensor, a predetermined combination of the conductive members including certain ones of the wire segments will be placed in contact simultaneously with the flowable material so as to generate an output voltage corresponding to the combination and thereby represent the roll angle of the sensor. In a preferred configuration of this embodiment, the housing chamber is configured so as to define a central elongation axis and the array of four wire segments is located within the chamber in a substantially common plane perpendicular to the elongation axis such that, if the housing is oriented so that one of the wire segments is at a twelve o'clock position, the other three wire segments are positioned at three, six and nine o'clock, respectively, with respect to the position of the first mentioned wire segment.

In still another embodiment of the present invention, the arrangement of electrically conductive members include first, second, third, fourth, and fifth such members disposed at first, second, third, fourth, and fifth spaced apart locations, respectively, within an elongated housing chamber and along the chamber's elongation axis such that the first and third members are disposed at substantially the ends of the chamber, the second member is disposed at substantially the center of the chamber, and the fourth and fifth are disposed on opposite sides of the second member between the latter and the first and third members, respectively. A flowable material is contained within this chamber and through which electrical connections between the electrically conductive members are made (1) such that, in one mode of operation of the sensor, the ratio between an electrical property, for example voltage, of the first member and second member to the corresponding electrical property of the third and second member is indicative of displacement of the flowable material within the housing chamber, whereby the pitch sensor is capable of generating a first mode output voltage which is also indicative of the pitch position of the sensor, and (2) such that, in a second mode of operation of the sensor, a ratio between the same electrical property of the fourth member and second member to the corresponding electrical property of the fifth member and the second member is also indicative of displacement of the flowable material within the chamber, whereby the pitch sensor is capable of generating a second mode output voltage which is also indicative of the pitch position of the sensor. In this latter embodiment, the various electrically conductive members could be configured as rings, cylinders, and/or plate members (in the case of the first and third members) and arrays of wire segments (in the case of the second, fourth, and fifth members).

In accordance with a further embodiment of the present invention, at least three electrically conductive members are contained within an elongated housing chamber which also contains a flowable material of the type described previously such that the sensor serves to measure pitch. In this embodiment, the three conductive members can be configured as rings, plates, cylinders and/or arrays of wire segments. However irrespective of the particular configuration of each conductive member, means are provided for adjusting to a limited extent the positional relationship between these members along the elongation axis of the housing chamber, whereby to calibrate the output voltage of the sensor with respect to displacement of flowable material within the chamber. In a preferred arrangement of this embodiment, the first and third conductive members are located at or near the end of the chamber and the second member is located approximately the center of the chamber, longitudinally speaking, and the adjusting means includes means for moving one of the first and third members along elongation axis to a limited extent, towards and away from the second member.

BRIEF DESCRIPTION OF THE DRAWINGS

The various embodiments of applicant's orientation sensor will be described in more detail hereinafter in conjunction with the drawings wherein.

DETAILED DESCRIPTION OF THE INVENTION

Figure 1:
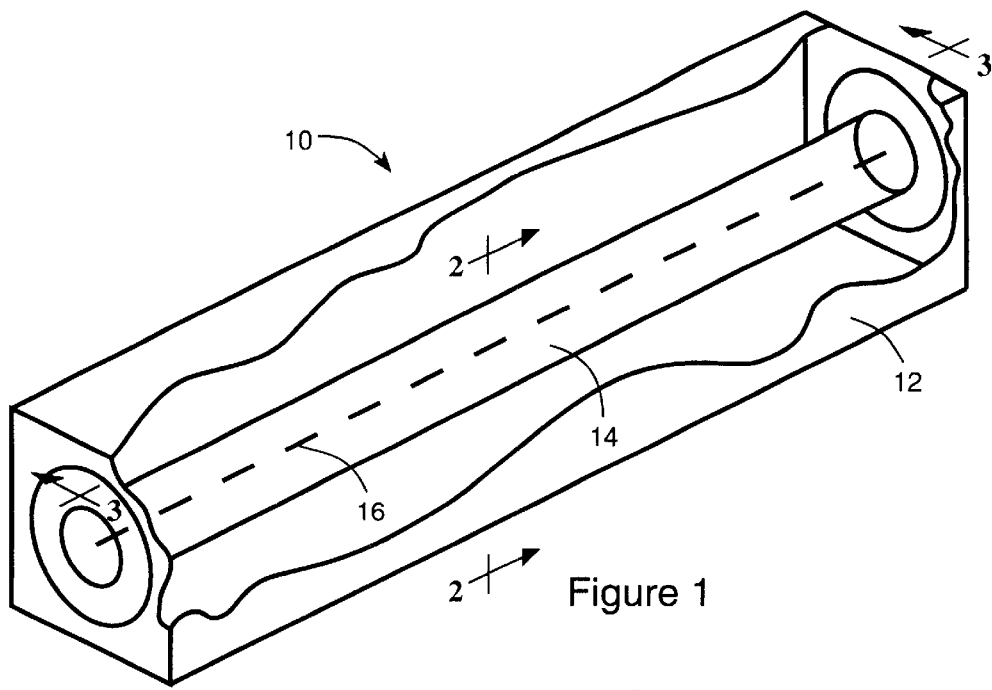
FIG. 1 is a partially broken away diagrammatic perspective view of an orientation sensor designed in accordance with one embodiment of the present invention.
Figure 2:
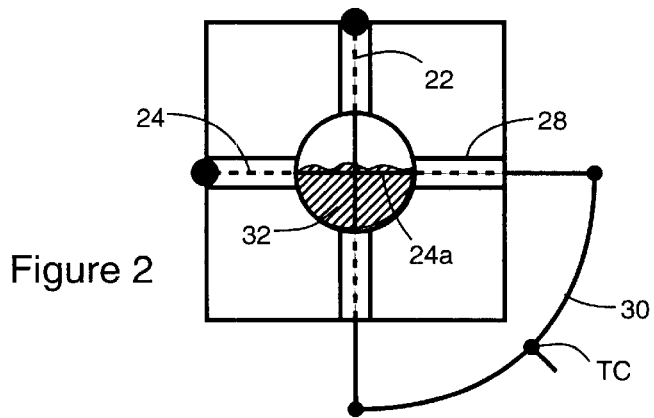
FIG. 2 is a cross-sectional view of the sensor illustrated in FIG. 1, taken generally along line 2—2 in FIG. 1.

Turning now to the drawings, wherein like components are designated by like reference numerals throughout the various figures, attention is first directed to FIGS. 1–4. These figures illustrate a pitch sensor which is designed in accordance with one embodiment of the present invention and which is generally designated by the reference numeral 10. Pitch sensor 10 is shown including a pitch sensor housing 12 defining an elongated closed internal chamber 14 which defines a central elongation axis 16. In the embodiment illustrated, the cross-sectional configuration of chamber 14 is circular, as best illustrated in FIG. 2, although it could be square, rectangular or any other reasonable shape so long as it is compatible with the invention. As illustrated best in FIG. 1 in conjunction with FIG. 3, pitch sensor 10 is shown including first and second electrically conductive plate members 18 and 20 fixedly mounted to housing 12, at least partially within and defining the ends of chamber 14.

Figure 3:
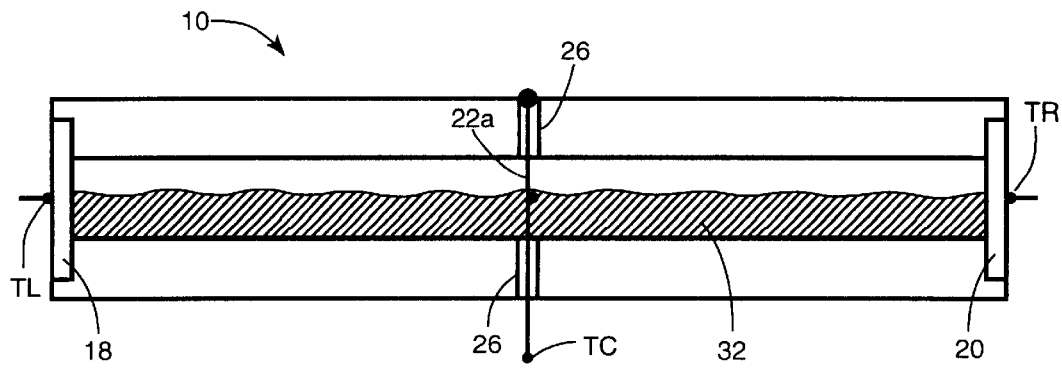
FIG. 3 is a longitudinal sectional view of the orientation sensor of FIG. 1, taken generally along line 3—3 in FIG. 1.

Referring specifically to FIG. 2 in conjunction with FIG. 3, pitch sensor 10 is also shown including a third electrically conductive member designed in accordance with one aspect of the present invention. Specifically, this third electrically conductive member includes two electrically conductive wires 22 and 24. Electrically conductive wire 22 extends through diametrically opposed through holes 26 in housing 12 so as to include a segment 22a disposed within chamber 14. In a similar manner, electrically conductive wire 24 extends through cooperating, diametrically opposed through holes 28 such that a segment 24a is disposed within chamber 14 transverse to segment 22a. In the specific embodiment illustrated, the two electrically conductive wire segments 22a and 24a are positioned substantially within a common plane normal to the elongation axis 16 of chamber 14 at a location approximately centrally located between the two electrically conductive end plates 18 and 20 with wire segment 24a extending perpendicular to wire segment 22a and such that their common crossing point is coincident with elongation axis 16. Through-holes 26 and 28 may be provided in any suitable manner but are most economically provided by means of drilling, injection molding, or any suitable means.

For the reasons to be described below, the two electrically conductive wires 22 and 24 are permanently electrically connected together, for example in the manner diagrammatically depicted in FIG. 2 wherein a separate jump wire 30 connects together corresponding ends of the two wires. In that case, the other ends of the wires are held in place by suitable means such as enlarged ends (as shown), crimping, glue, or the like. As an alternative, a single wire could be threaded through all four openings 22 and 24 in a crisscross fashion to accomplish the same result without having to use a jump wire 30.

Still referring to FIGS. 1–3, chamber 14 is partially filled with a suitable conductive fluid, for example, glycerin with a small quantity of saline solution added to provide for conductivity, selected as described below and in Applicant's above recited patents. In order to function in the manner intended, chamber 14 is filled with conductive fluid 32 to a level at or just slightly above elongation axis 16 when the chamber is perfectly horizontal. That is, the fluid just covers wire segment 24a when the latter and the elongation axis extend horizontally, as illustrated in FIG. 2. Considerations relating to the fluid level in the chamber will be further described at appropriate points hereinafter.

Figure 4:
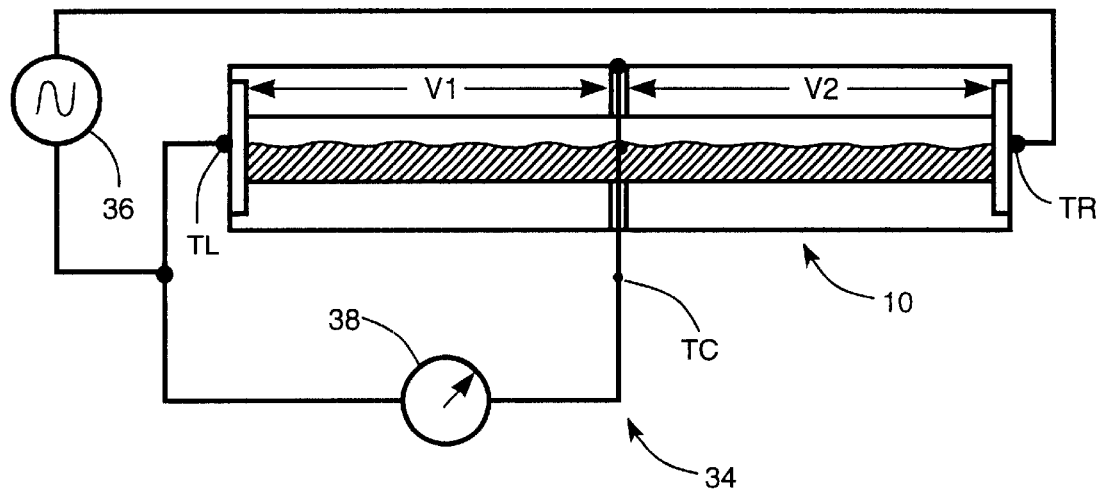
FIG. 4 is a schematic diagram depicting how the orientation sensor of FIG. 1 functions from an electrical standpoint.

In order for pitch sensor 10 to function as a pitch sensor in the intended way, it is connected to a suitable drive circuit, for example the one illustrated in Applicant's above recited patents or a simplified version could be provided, as illustrated in FIG. 4 and generally designated by the reference numeral 34. This simplified drive circuit is shown including an A/C voltage source 36 and a voltmeter 38 which are connected to one another and to device 10 such that the device functions as a voltage divider. Specifically, as illustrated in FIG. 4, one side of the voltmeter 38 is connected to the two wires 22 and 24 by means of terminal TC. The other side of the voltmeter is connected to electrically conductive plate member 18 and to one side of voltage source 36 which is also connected to member 18, all by means of terminal The other side of the voltage source 36 is connected to electrically conductive plate member 20 by means of terminal TR.

Having described pitch sensor 10 and drive circuit 34 from a structural standpoint, attention is now directed to the way in which the pitch sensor operates. In this regard, from an operational standpoint, it may function in the manner described in Applicant's above recited patents utilizing the drive circuit in those patents or, in fact, it could function in the manner described in the Geller and Baker patents recited above utilizing their drive circuitry. Nevertheless, its operation will be described here in conjunction in drive circuit 34. As stated immediately above, the pitch sensor itself functions in this overall circuitry as a voltage divider. If it is assumed for the moment that the pitch sensor is perfectly horizontal, electrically conductive fluid 32 will cover the same amount of surface area of plate member 18 as plate member 20. As a result, the voltage applied across the pitch sensor, that is, from terminal TL at one end to terminal TR at the other end, will be divided precisely in half, that is, one half of the voltage will appear between terminal TL and terminal TC while the other half will appear between terminal TC and terminal TR. Thus, the voltage v1 and the voltage v2 illustrated in FIG. 4 will be equal. If the pitch sensor is pivoted clockwise, for example, more of the surface area of member 20 becomes covered with fluid 32 while less of the surface area of member 18 is covered. As a result, the voltages v1 and v2 become proportionately dissimilar. Thus, by monitoring one of these voltages, for example the voltage v1, as illustrated, the pitch of the sensor can be so monitored.

In the embodiment illustrated in FIGS. 1–3, pitch sensor 10 has been described as including two wire segments 22 and 24 maintained in a perpendicular relationship to one another. It is to be understood that the present invention is not limited to this configuration. Indeed, one or more wire segments could be utilized so long as at least one of the segments is at all times in contact with conductive fluid 32 and the pitch sensor operates in the manner described. Thus, while the use of a single wire segment is possible, it would only be practical where the pitch sensor itself has no roll component or at least the roll component is controlled so as to insure that the single wire segment is always in contact with the fluid and this assumes the conductive fluid is filled less than half way within its chamber. It will always work with a single wire if the chamber is filled more than half way irrespective of roll. The two perpendicular wire segments 22a and 24a, in the perpendicular configuration illustrated, insures that at least one wire segment will always be in contact with fluid 32 when the latter is filled to the level describe. In this way, the pitch sensor operates independent of roll. Moreover, pitch sensor 10 has been described using a conductive fluid so as to measure voltage by means of current flow through the fluid. In this and all the other sensor embodiments disclosed herein, the fluid could be dielectric fluid, for example glycerin, as contrasted with conductive fluid, so that the voltage is measured by means of relative capacitance rather than relative resistance.

It is not suggested here that pitch sensor 10, as described above, functions as a roll independent pitch sensor in any way that is different than those described in the above recited patents, from a functional standpoint However, the utilization of electrically conductive wires 22 and 24, as contrasted with rings or cylinders, make the pitch sensor much more economical to manufacture than those in the past.

Figure 5:
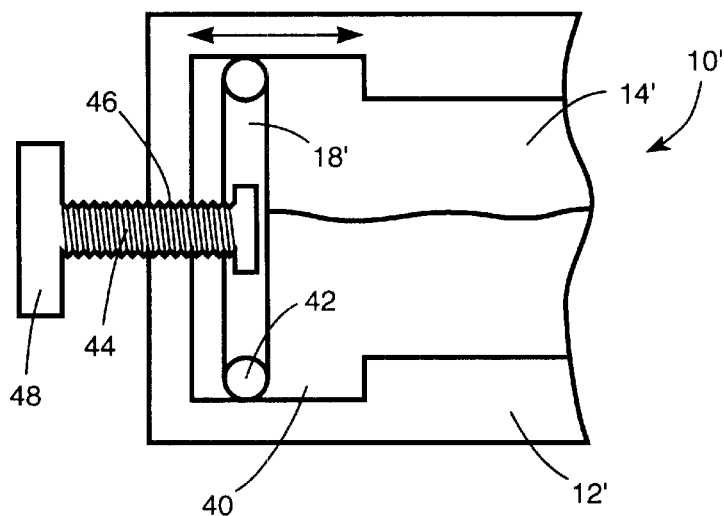
FIG. 5 is an enlarged longitudinal sectional view of a modified section of the orientation sensor of FIG. 1, thereby establishing a second embodiment of the present invention but specifically one which adds calibration to the sensor of FIG. 1.

Pitch sensor 10 has been described including electrically conductive plate members 18 and 20 and wire segments 22a and 24a in a fixed positional configuration. In accordance with another embodiment of the present invention, the sensor is designed so that this positional configuration can be changed to provide the sensor with calibration capabilities. In particular, FIG. 5 illustrates a modified pitch sensor 10' which may be identical to sensor 10, except for its left hand end illustrated in FIG. 5. This end of sensor 10' is shown including an electrically conductive plate member 18' which is longitudinally movable, to a limited extent, within chamber 14' defined by housing 12'. Note specifically that chamber 14' includes a longitudinally extending, radially enlarged circumferential end section 40 which allows end plate 18' and a sealing ring 42 extending around the plate to slidably move longitudinally while maintaining a seal around the interior of chamber 14' so as to prevent the leakage of electrically conductive fluid 32. Alternatively, plate 18' could permit fluid to flow through it and sealing could be accomplished around shaft 44 using suitable sealing means (not shown). In this way, the electrically conductive plate 18' can be adjustably located between an extreme left hand position, as viewed in FIG. 5, and an extreme right hand position within the enlarged circumferential end section 40. Movement of the end plate is accomplished by means of a threaded shaft 44 disposed within a cooperating threaded opening 46 through housing 12'. One end of the threaded shaft is rotatedly coupled but otherwise fixed to plate member 18' while the other end carries an adjustment thumb wheel 48. By rotating the thumb wheel in one direction, the threaded shaft moves forward into the housing causing the plate member to move with it. Movement of the thumb wheel in the opposite direction causes the shaft to move backward, bringing the plate member with it. With regard to section 40, for purposes of symmetry, a similar section should be provided at the other end of the chamber.

Having described pitch sensor 10' structurally, attention is now directed to the way in which it can be calibrated or zeroed. One way to do this is to initially position the pitch sensor horizontally so that the voltage measured by voltmeter 38, that is, voltage v1 (see FIG. 4) should be precisely one-half the total voltage between terminals TL and TR. If it is, no calibration is necessary. However, if the measured voltage v1 is more or less than one-half the total voltage, then the adjustable conductive plate member 18' should be moved either to the right or the left until the measured voltage v1 is precisely one-half of the total voltage, thereby calibrating the pitch sensor. Obviously, the present invention is not limited to moving electrically conductive member 18' specifically. The electrically conductive member on the other side of the pitch sensor could be made adjustable alternatively or it could be made adjustable along with member 18' in order to get a greater calibration range. Indeed, even the centrally located conductive member could also be made longitudinally adjustable.

Figure 6:
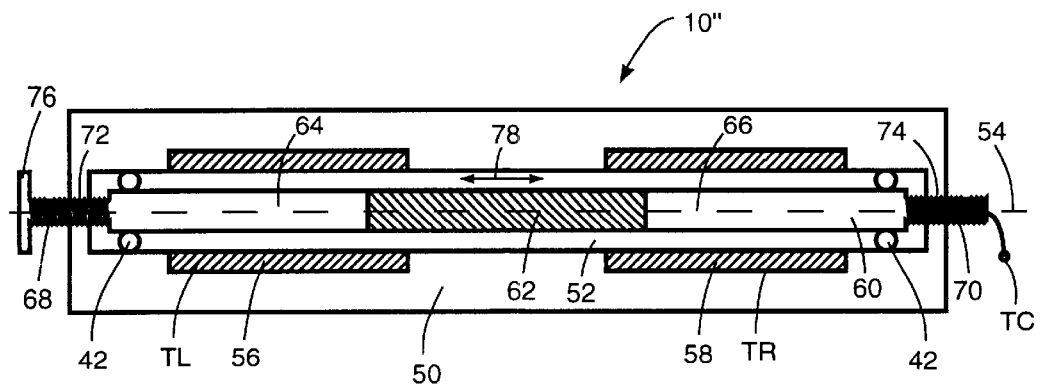
FIG. 6 is a diagrammatic longitudinal sectional view of an orientation sensor designed in accordance with still another embodiment of the present invention, specifically one which also provides calibration in a different way than the embodiment illustrated in FIG. 5.

From an operational standpoint, pitch sensor 10" functions in the same way as previously described pitch sensors 10 and 10'. Specifically, the two cylindrical conductors 56 and 58 functionally correspond to previously described plate members 18 and 20 and electrically conductive section 62 of rod 60 corresponds functionally to the array of wire segments 22a and 24a. From an electrical circuit standpoint, the cylinder 56 would be connected to the TL terminal of the circuit shown in FIG. 4, the cylinder 58 would be connected to the TR terminal and the electrically conductive section 62 of rod 60 would be connected to the TC terminal, as diagrammatically illustrated in FIG. 6. Pitch sensor 10" can be calibrated in the same manner pitch sensor 10'. That is, the pitch sensor 10" could first be positioned horizontally so that an initial reading of voltage v1 (FIG. 4) could be taken. If this voltage reading is not precisely one-half of the total voltage between terminals TC and TR., then the rod 60 could be adjusted longitudinally, either to the left or the right as view in FIG. 6, until voltage v1 is precisely one-half the total voltage.

Figure 7:
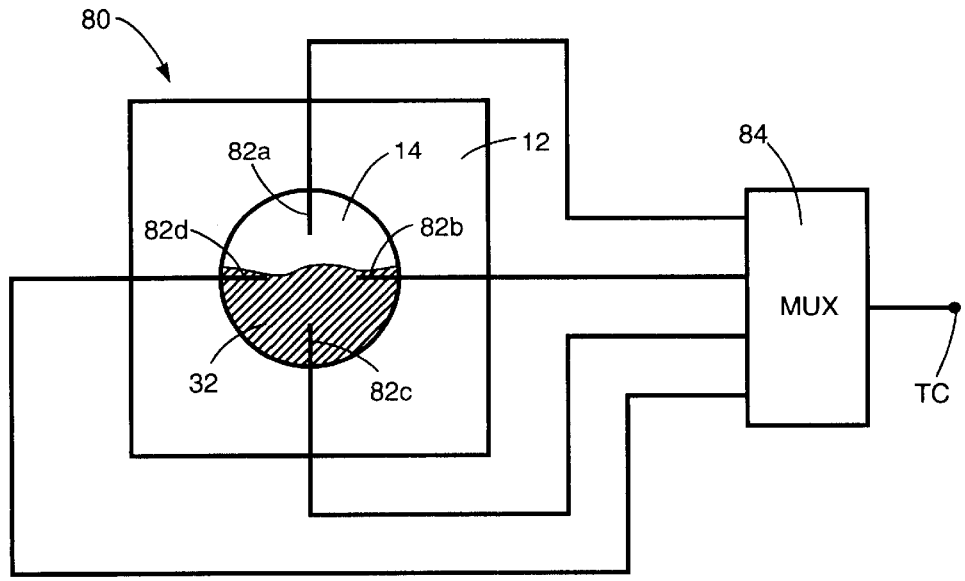
FIG. 7 is a diagrammatic illustration of still another modified version of the orientation sensor of FIGS. 1–3 and specifically a version which allows the sensor to act as a pitch and/or roll sensor.

All of the pitch sensors described thus far, that is, pitch sensors 10, 10', and 10" are roll insensitive, that is, the measured output voltage v1 is independent of the roll orientation of the pitch sensor. FIG. 7 illustrates still another orientation sensor 80 which is designed not only to measure pitch, but is primarily designed to measure roll. This orientation sensor may be identical to the previously described pitch sensor 10, with one exception. In pitch sensor 10, the wire segments 22a and 24a are connected together and the array is connected to the terminal TC, as illustrated best in FIG. 2. In the case of orientation sensor 80, its central electrically conductive arrangement is shown consisting of four unconnected wire segments 82a, 82b, 82c, and 82d disposed within chamber 14 in a common plane normal to the elongation axis 16 of the chamber and centrally located between the ends of the chamber. Each wire segment 82 extends radially into chamber 14 not quite to the center thereof. As illustrated in FIG. 7, these wire segments form the ends of longer wires which extend out of the housing through cooperating through-holes, which like previously described through-holes 26 and 28 (FIGS. 2 & 3) may be pre-drilled or otherwise provided. As also illustrated in FIG. 7, the four wire segments 82a, 82b, 82c, and 82d are positioned relative to one another such that if wire segment 82a is at the twelve o'clock position, wire segments 82b, 82c, and 82d are in the three o'clock, six o'clock, and nine o'clock positions, respectively. At the same time, the electrically conductive fluid 32 described previously in conjunction with pitch sensor 10 fills slightly more than half of chamber 14. Thus, when orientation sensor 80 is perfectly horizontal, as illustrated in FIG. 7, the electrically conductive fluid just barely contains the three wire segments 82b, 82c, and 82d but not wire segment 82a.

Still referring to FIG. 7, each of the wires including an end segment 82a–d extends through a conventional and readily providable multiplexor 84 having as its output the terminal TC which functionally corresponds to the same terminal in the circuitry of FIG. 4. Thus, by using multiplexor 84, the voltage v1 (FIG. 4) can be successively monitored for the combination of end plate members 18 and 20 (FIG. 3) and each individual wire segment 82a–d In this way, the roll position of sensor 80 can be monitored, as will be described immediately below in conjunction with FIGS. 8a–8c.

Figure 8A:
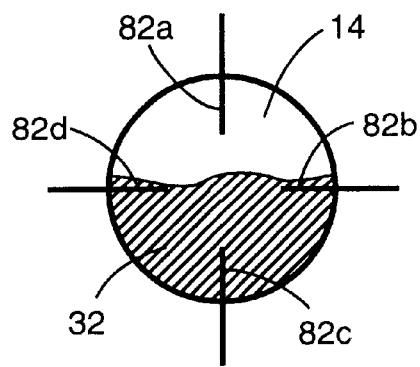
FIGS. 8a, 8b, & 8c diagrammatically illustrates the way in which the sensor of FIG. 7 functions as a roll sensor.
Figure 8B:
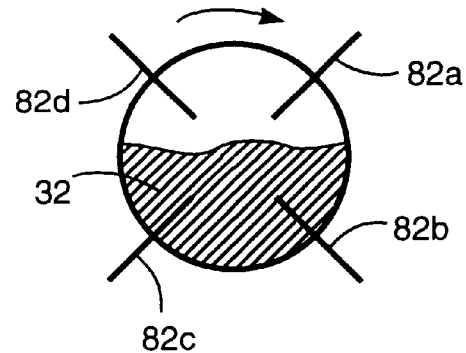
Figure 8C:
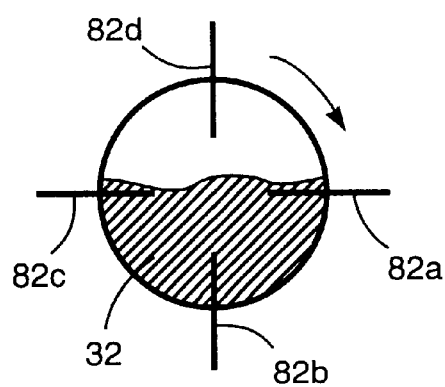

Turning now to FIG. 8a, pitch sensor 80 is diagrammatically shown in its FIG. 7 position, that is, extending horizontally with the four wire segments 82a–d in the twelve, three, six, and nine o' clock positions, respectively. With the pitch sensor oriented in this manner, successive measurements of voltage v1 can be made for each of the wire segments using multiplexor 84. In this case, a voltage will be measured for each of the wire segments 82b, c, and d because each of these latter wire segments is in contact with the conductive fluid 32. However, no voltage will appear between the wire segment 82a and conductive plate member 18 since wire segment 82 is not in contact with the conductive fluid and, hence, results in an open circuit. This tells the operator that the roll position of the orientation sensor corresponds to FIG. 8a. Let it now be assumed that the sensor has rolled to the position illustrated in FIG. 8b. Under this circumstance, it should be noted that only the wire segments 82b and 82c are in contact with the electrically conductive fluid 32 and, hence, only v1 voltage values will be measured for wire segments 82b and 82c, thereby indicating to the operator that the roll position of the orientation sensor corresponds to the position illustrated in FIG. 8b. Assume now that the orientation sensor rotates further clockwise to the position shown in FIG. 8c. Under these circumstances, the wire segments 82a, 82b, and 82c are now in contact with the electrically conductive fluid 32 while wire segment 82d is not. Accordingly v1 voltages will be obtained for the former three wire segments but not the latter one. Accordingly, the operator will be able to tell that the orientation sensor corresponds to the position illustrated in FIG. 8c. It should be clear that for any roll position of sensor 80, at least two and at most three wire segments will make contact with electrically conductive fluid 32 and, thus, the operator can monitor all roll positions by monitoring the v1 voltage associated with each of these wire segments.

Orientation sensor 80 has been described with respect to its ability to monitor roll. It should be apparent that it can also monitor pitch in the same way as sensors 10, 10' and 10" by monitoring the actual magnitude of the v1 voltage associated with any of the wire segments that is in physical contact with the fluid medium. Moreover, while orientation sensor 80 functions as a roll sensor, its resolution is limited by the utilization of only four wire segments 82. Its resolution can be improved by adding additional wire segments, as illustrated, for example, in FIG. 9. As seen there, a modified orientation sensor 80' is shown. This modified orientation sensor is identical to sensor 80, except that sensor 80' includes eight wire segments rather than four. For purposes of convenience, these latter wire segments are indicated as segments 1–8. The sensor is shown in a position corresponding to FIG. 8a in which wire segment 1 is in the twelve o'clock position while wire segments 2–8 are in the following positions, respectively: one-thirty; three o'clock; four-thirty; six o'clock; seven-thirty; nine o'clock; and ten-thirty. In the case of sensor 80', with fluid 32 filling chamber 14 to or just slightly above the half-way mark, at least four wire segments will simultaneously make contact with the fluid and at most five wire segments will make contact. Thus, using the procedure described with respect to sensor 80, the operator can determine to a greater accuracy the roll position of sensor 80'. Obviously the present invention is not limited to the number of positions of these wires. For example, one could use six equally spaced wires or even a single wire where you just want to know if the device has rolled off a predetermined position. Also the length of the wire or wires is not critical so long as the device functions in the intended manner.

Figure 10:
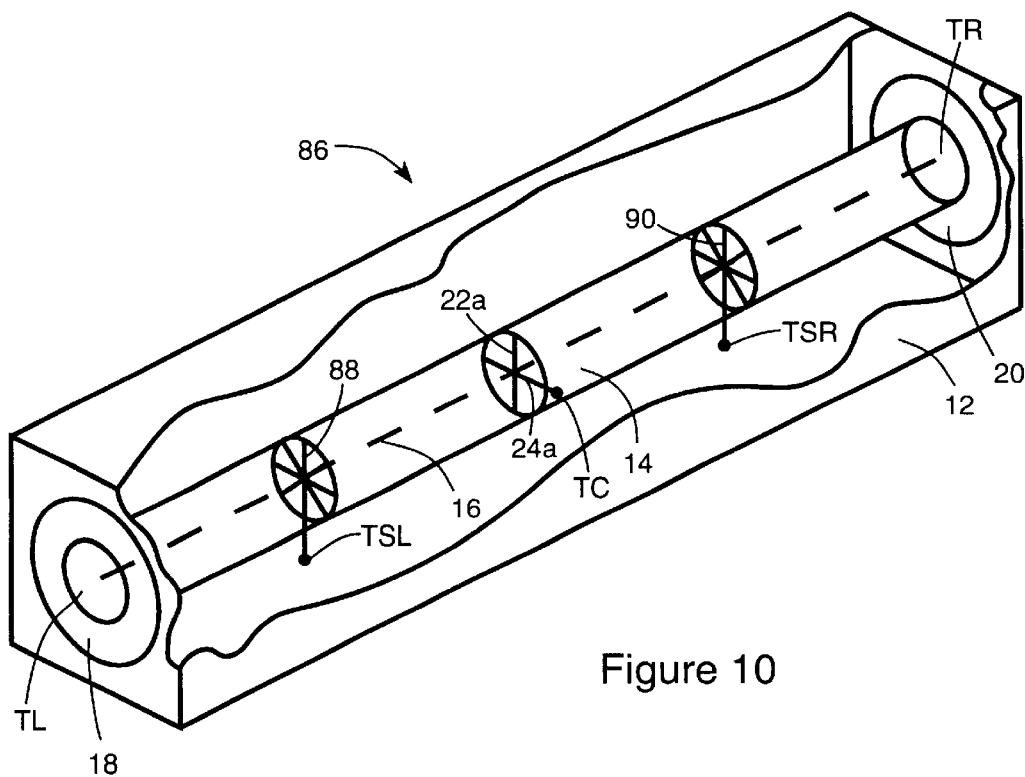
FIG. 10 is a partially broken away diagrammatic perspective view of an orientation sensor designed in accordance with still a further embodiment of the present invention.

Turning now to FIG. 10, attention is directed to a pitch sensor 86 which is designed in accordance with a further embodiment of the present invention. This pitch sensor may be identical in all respects to pitch sensor 10, with one exception. Whereas pitch sensor 80 was described including three conductive members, plate members 18 and 20 and wires array 22a, 24a, pitch sensor 86 includes five conductive members. They are the three conductive members just mentioned, that is, those forming part of pitch sensor 10 plus fourth and fifth electrically conductive members 88 and 90. Both of these latter electrically conductive members are in the form of electrically conductive screens positioned within housing chamber 14 on opposite sides of wire segment array 22a, 24a longitudinally between the latter and plate members 18 and 20 respectively, in planes normal to the elongation axis 16. These screens are sufficiently porous to allow the electrically conductive fluid medium 32 to flow freely therethrough, essentially as if they were not there. As illustrated in FIG. 10, screen 88 is connected to an external terminal TSL while screen 90 is connected to an external terminal TSR for the reasons to be discussed below in conjunction with FIG. 11. At the same time, the plate members 18 and 20 are connected to terminals TL and TR, respectively, and the wire segment array 22a, 24a is connected to terminal TC, in the manner described previously.

Figure 11:
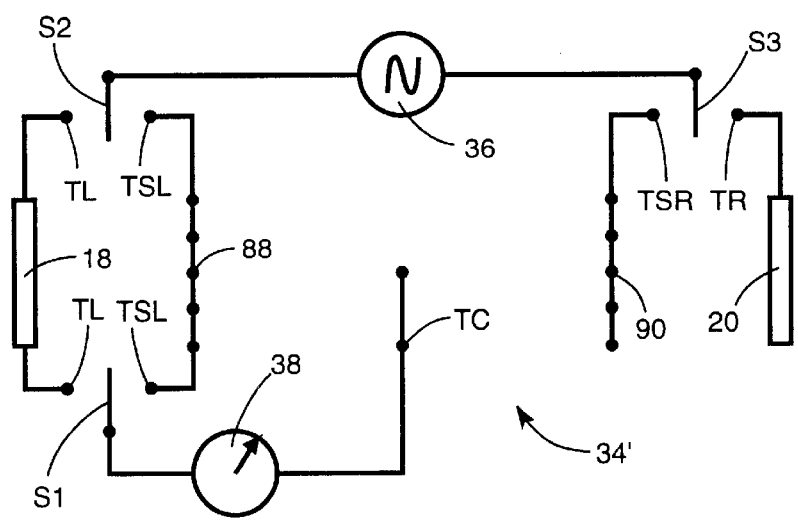
FIG. 11 diagrammatically illustrates the way in which the sensor of FIG. 10 operates from an electrical standpoint.

Turning now to FIG. 11, attention is directed to the circuit 34' which is used to operate pitch sensor 86 in a manner similar to the way in which circuit 34 (FIG. 4) operates pitch sensor 10. As seen in FIG. 11, circuit 34' includes the same voltage source 36 and voltmeter 38 as circuit 34. However, circuit 34' also includes three switches, s1, s2, and s3. One side of voltmeter 38 is connected to the terminal TC, as in circuit 34, however its other side is alternatively connected between terminals TL and TSL by means of switch s1. At the same time, one side of voltage source 36 is alternatively connected between the terminals TL and TSL by means of switch s2 while the opposite side of the voltage source is alternatively connected between the terminals TSR and TR by means of switch s3.

Figure 12A:
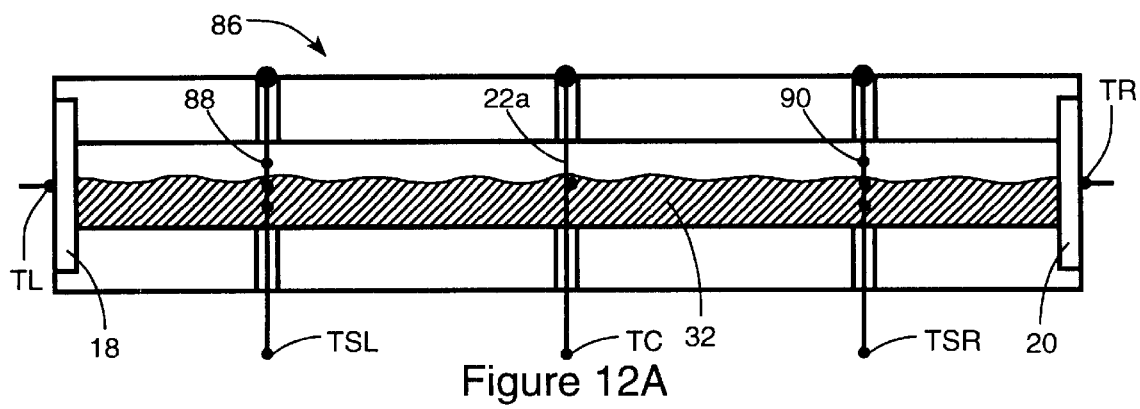
FIGS. 12a, 12b, & 13 diagrammatically illustrate the way in which the sensor of FIG. 10 functions as a pitch sensor.
Figure 12B:
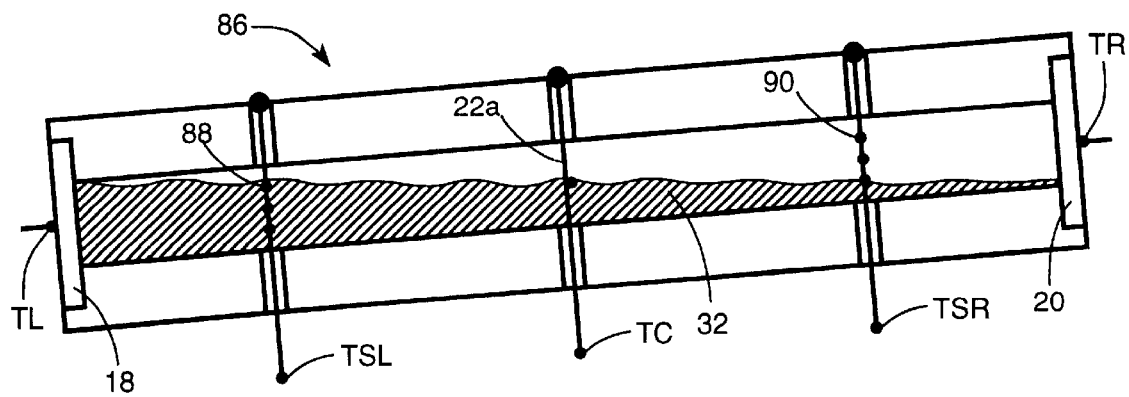
Figure 13:
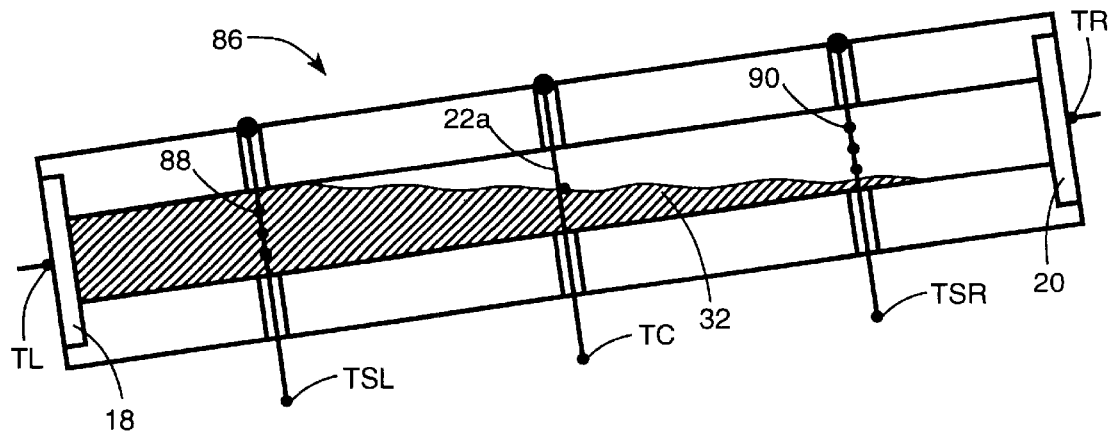

With circuit 34' described immediately above from a structural standpoint, attention is now directed to the way in which it operates the pitch sensor 86 in two different operating modes. With switch s1 in its TL position, switch s2 in its TL position, and switch s3 in its TR position, circuit 34' operates pitch sensor 86 in precisely the same manner that circuit 34 operates pitch sensor 10, as described previously. This first mode of operation is used, for example, when the pitch sensor is at a pitch angle between plus or minus 10% grade. However, when the pitch sensor moves outside this range, the switches s1, s2, and s3 can be moved to their alternate positions illustrated in FIG. 11. In this mode of operation, the voltmeter is connected between the central wire segment array 22a, 24a and screen 88 and the voltage source 36 is connect across this latter wire screen and wire screen 90. In this second mode of operation, the wire screens 88 and 90 replace electrically conductive members 18 and 20, thereby effectively reducing the longitudinal length of the overall pitch sensor. In this mode, the v1 voltage being measure by the voltmeter 38 extends between screen 88 and wire segment array 22a, 24a. This mode of operation is used, for example when the pitch sensor is at an orientation greater than 10% grade. FIGS. 12a and 12b illustrate the extreme positions of the pitch sensor 86 in its first mode of operation, that is, for example, between 0% grade (FIG. 12a) and 10% grade (FIG. 12b), while FIG. 13 shows the pitch sensor operating in the second mode when it is at a pitch angle greater than, for example 10% grade. The reason it is necessary to have this second mode of operation is that at a certain point as the pitch sensor increases in pitch, none of the fluid makes contact with one of the end plate members, for example plate member 20, while the other plate member is entirely in contact with the fluid at a number of different pitch points. Under these circumstances, as illustrated in FIG. 13, the first operating mode described above would be ineffective.

While pitch sensor 86 has been described including two modes of operation, it is to be understood that additional pairs of screens corresponding to screens 88 and 90 could be utilized so as to increase the number of modes of operation. Moreover, it is to be understood that the present invention is not limited to operating modes between the ranges recited above. The positional relationship of the various conductive members can be arranged to accommodate different grade ranges. Further, it is to be understood that the present invention is not limited to wire screens for members 88 and 90 but could utilize arrays of wire segments similar to the array 22a, 24a so long as these latter members allow free flow of the fluid medium and accurately reflect the amount of surface area that contacts the fluid as in the case of the screens or solid members 18 and 20. In addition, the roll measuring feature of sensor 80 could be incorporated into sensor 86 by replacing wires 22a, 24a with the arrangement shown in FIGS. 8 or 9. Moreover, one or both end members 18 and 20 could be made to be adjustable as in the case of member 18' (FIG. 5).

Figure 14:
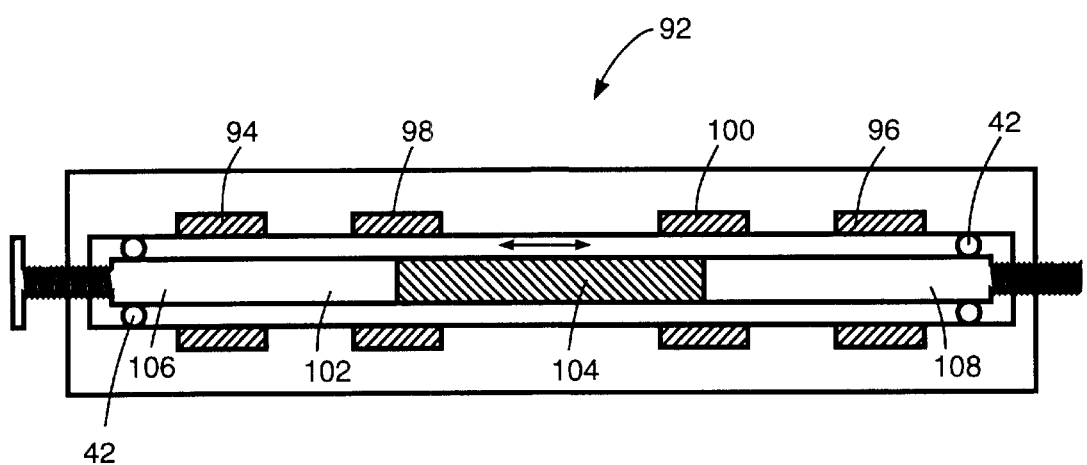
FIG. 14 is a diagrammatic longitudinal sectional view of a modified version of the sensors of FIGS. 6 and 10.

Finally, turning to FIG. 14, attention is directed to a pitch sensor 92 which is designed in accordance with still a further embodiment of the present invention. Pitch sensor 92 is also a multi-mode pitch sensor and functions in essentially the same manner as pitch sensor 86 described above. However, rather than including electrically conductive end plates 18 and 20, a central wire segment array 22a, 24a, and screens 88 and 90, sensor 92 utilizes four electrically conductive cylindrical members 94, 96, 98, and 100 and a central shaft 102. From an operational standpoint, cylindrical members 94 and 96 correspond to end plates 18 and 20, respectively. Shaft 102 corresponds to the central wire segment array 22a, 24a and cylindrical members 98 and 100 correspond to screens 88 and 90, respectively. From a structural standpoint, cylindrical members 94 and 96 correspond to cylindrical members 56 and 58 forming part of overall pitch sensor 10" and shaft 102 is identical to shaft 60. Thus, shaft 102, like shaft 60 includes an electrically conductive longitudinal section 104 located between dielectric segments 106 and 108. The five electrically conductive segments of sensor 92 are connected up to previously described circuit 34' in the same manner as pitch sensor 86 and therefore operates in its first and second mode in the same way. The operational difference between sensor 92 and sensor 86 is that the former can be calibrated in the same manner as sensor 10".

Figure 9:
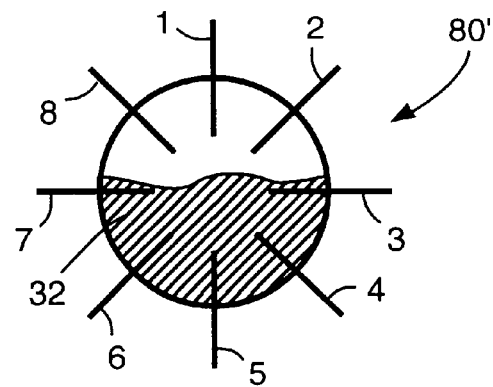
FIG. 9 diagrammatically illustrates a modification to the sensor illustrated in FIG. 7.

In the case of sensor 92, the central shaft could be replaced with either the wire arrangement 22a, 24a or the wire arrangements shown in FIGS. 8 and 9. Also, this sensor could be made without the calibration feature.

What is claimed is:

1. A pitch sensor capable of generating an output voltage indicative of fluid displacement within the pitch sensor, comprising:

(a) a pitch sensor housing defining a closed, elongated internal chamber which itself defines a central elongation axis;

(b) first, second and third electrically conductive members disposed at first, second and third spaced apart locations, respectively, within said chamber and along said elongation axis such that said second member is disposed between said first and third members;

(c) a flowable material contained within said chamber and through which electrical connections between said electrically conductive members are made by said flowable material contacting portions of said first, second and third electrically conductive members such that a first ratio of an electrical property between the first member and the second member to the corresponding electrical property between the third member and the second member is indicative of displacement of said flowable material within said chamber and the pitch sensor uses said first ratio to generate the output voltage indicative of such material displacement; and (d) means for adjusting to a limited extent the positional relationship between said first, second and third members along said elongation axis, whereby to calibrate the output voltage of the pitch sensor with respect to displacement of said flowable material within said chamber.

2. A pitch sensor according to claim 1 wherein said adjusting means includes means for moving one of said first and third members along said elongation axis to a limited extent towards and away from said second member.

3. A pitch sensor according to claim 1 wherein said adjusting means includes means for moving said second member along said elongation axis to a limited extent towards and away from each of said first and third members.

4. A pitch sensor according to claim 1 including a fourth electrically conductive member disposed at a fourth location within said chamber and along said elongation axis between said first and second members and a fifth electrically conductive member disposed at a fifth location within said chamber and along said elongation axis between said second member and said third member, said second, fourth and fifth members being positioned relative to one another for contacting the flowable material such that, in a second mode of operation of the pitch sensor, a second ratio of said electrical property between the second and fourth members to the corresponding electrical property between the second and fifth members is indicative of displacement of said flowable material within said chamber and the pitch sensor uses said second ratio to generate the output voltage indicative of such material displacement.

5. A pitch sensor according to claim 4 wherein said fourth and fifth members are wire screens.

6. A pitch sensor according to claim 1 wherein said first and third electrically conductive members are co-axial rings positioned concentrically around the elongation axis of said chamber and wherein said pitch sensor includes a rod extending along the entire length of said chamber coincident with its elongation axis, said rod having outer segments thereof which are not electrically conductive and a central segment therebetween which is electrically conductive and which serves as said second electrically conductive member.

7. A pitch sensor according to claim 1 wherein all of said electrically conductive members are co-axial rings positioned concentrically around the elongation axis of said housing chamber.

8. A pitch sensor capable of generating an output voltage indicative of fluid displacement within the pitch sensor, comprising:
  (a) a pitch sensor housing defining a closed, elongated internal chamber which itself defines a central elongation axis;
  (b) first, second, third, fourth and fifth electrically conductive members disposed at first, second, third, fourth and fifth spaced apart locations, respectively, within said chamber and along said elongation axis such that said first and third members are disposed at substantially the ends of said chamber, said second member is disposed at substantially the center of the chamber, and said fourth and fifth members are disposed on opposite sides of said second member between the latter and said first and third members, respectively; and
  (c) a flowable material contained within said chamber and through which electrical connections between said electrically conductive members are made such that, in one mode of operation of the pitch sensor, a first ratio of an electrical property between the first member and the second member to the corresponding electrical property between the third member and the second member is indicative of displacement of said flowable material within said chamber and the pitch sensor uses said first ratio to generate the output voltage indicative of such material displacement, and such that, in a second mode of operation of the pitch sensor, a second ratio of an electrical property between the fourth member and the second member to the corresponding electrical property between the fifth member and the second member is indicative of displacement of said flowable material within said chamber and the pitch sensor uses said second ratio to generate the output voltage indicative of such material displacement.

9. A method of calibrating a pitch sensor having (i) a pitch sensor housing defining a closed internal chamber, (ii) an arrangement of electrically conductive members in a predetermined positional relationship to one another within the chamber, and (iii) a flowable material contained within said chamber and through which electrical connections between said electrically conductive members are made such that a ratio of an electrical property between a certain combination of said members to the corresponding electrical property between a different combination of said members is indicative of displacement of said flowable material within said chamber and the pitch sensor uses said ratio to generate the output voltage indicative of such material displacement, said method comprising the steps of:
  (a) generating an initial output voltage indicative of the displacement of said flowable material with the pitch sensor housing at a predetermined orientation and said electrically conductive members in fixed positions relative to one another;
  (b) determining whether said initial output voltage actually indicates accurately what the displacement of said flowable material should be with the pitch sensor housing at said predetermined orientation; and
  (c) if said initial output voltage does not accurately indicate what the displacement of said flowable material should be with the pitch sensor housing at said predetermined orientation, adjusting the positional relationship of said electrically conductive member and then repeating these steps (a), (b) and (c) until the output voltage does accurately indicate what the displacement of said flowable material should be with the pitch sensor housing at said predetermined orientation.

10. A method of monitoring the pitch of an object in at least two operating modes, comprising the steps of:
  (a) providing said object with a pitch sensor having (i) a pitch sensor housing defining a closed internal chamber, (ii) an arrangement of electrically conductive members in a predetermined positional relationship to one another within the chamber, and (iii) a flowable material contained within said chamber and through which electrical connections between said electrically conductive members are made such that, in one mode of operation of the pitch sensor, a first ratio of an electrical property between a first combination of said members to the corresponding electrical property between a second combination of said members is indicative of displacement of said flowable material within said chamber and the pitch sensor uses the first ratio to generate an output voltage indicative of such material displacement, and such that, in a second mode of operation of the pitch sensor, a second ratio of an electrical property between a third combination of said members to the corresponding electrical property between a fourth combination of said members is indicative of displacement of said flowable material within said chamber and the pitch sensor uses the second ratio to generate the output voltage indicative of such material displacement and thereby the pitch of said object;

(b) operating said pitch sensor in said first mode of operation under first predetermined circumstances so as to generate the output voltage and thereby determine the pitch of said object under said first predetermined circumstances; and (c) operating said pitch sensor in said second mode of operation under other second predetermined circumstances so as to generate the output voltage and thereby determine the pitch of said object under said second predetermined circumstances.

11. A method according to claim 10 wherein said first combination of conductive members is configured such that said pitch sensor is operated in said first mode when the pitch of the sensor is within a pitch range of plus or minus a certain percentage of grade and wherein said second combination of conductive members is configured such that said pitch sensor is operated in said second mode when the pitch of the sensor is at a pitch outside said range of plus or minus a certain percentage of grade, said first and second predetermined circumstances corresponding to whether said pitch sensor is within or outside said range, respectively.

* * * * *